US011809307B2

(12) United States Patent
Chapagain et al.

(10) Patent No.: US 11,809,307 B2
(45) Date of Patent: *Nov. 7, 2023

(54) REQUIREMENTS TO TEST SYSTEM AND METHOD

(71) Applicant: IQVIA Inc., Danbury, CT (US)

(72) Inventors: Pranav P. Chapagain, Land O Lakes, FL (US); Massimo Franza, Tampa, FL (US); Ramon Eduardo Aldana Borjes, Tampa, FL (US)

(73) Assignee: IQVIA Inc., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/412,304

(22) Filed: Aug. 26, 2021

(65) Prior Publication Data

US 2021/0382816 A1    Dec. 9, 2021

Related U.S. Application Data

(63) Continuation of application No. 16/420,731, filed on May 23, 2019, now Pat. No. 11,106,569.

(51) Int. Cl.
*G06F 11/36* (2006.01)
(52) U.S. Cl.
CPC ...... *G06F 11/3688* (2013.01); *G06F 11/3664* (2013.01); *G06F 11/3692* (2013.01)
(58) Field of Classification Search
CPC ............. G06F 11/3684; G06F 11/3664; G06F 11/3688; G06F 11/3672; G06F 11/3676
See application file for complete search history.

(56) References Cited

U.S. PATENT DOCUMENTS

| 2009/0064130 | A1* | 3/2009 | Davis | G06Q 10/06 |
| | | | | 717/173 |
| 2012/0304096 | A1 | 11/2012 | Shikhnnan | |
| 2014/0165043 | A1 | 6/2014 | Pasala | |
| 2014/0181793 | A1 | 6/2014 | Kaliappan | |
| 2015/0095895 | A1 | 4/2015 | Taneja | |
| 2015/0178182 | A1 | 6/2015 | Mallya | |
| 2016/0004622 | A1* | 1/2016 | Kaulgud | G06F 11/3612 |
| | | | | 717/132 |
| 2016/0055079 | A1 | 2/2016 | Hanna | |
| 2016/0217062 | A1 | 7/2016 | Singi | |
| 2018/0074944 | A1* | 3/2018 | Hirt | G06F 11/3664 |

* cited by examiner

*Primary Examiner* — Duy Khuong T Nguyen
(74) *Attorney, Agent, or Firm* — STEVENS & LEE PC; John Maldjian

(57) ABSTRACT

A requirements to test (R2T) system is implemented, which provides an automated system by which a user interface (UI)-test automation script package is generated and the generated test scripts therein are executed against software. A visualized workflow is translated into some machine-consumable formatted file. The translated workflow is utilized by an artificial intelligence driven automated R2T engine to discover paths through the workflow, a series of executable steps for the paths that detail how the software will be used, and ultimately test scripts that are generated using pre-defined validation templates. An automation platform executes the test scripts through the software associated with the workflow, which automatically captures evidence of the executed test scripts to fulfill computer system validation requirements. The R2T system provides an automated solution for test script creation and system validation to expedite the validation process and thereby streamline a software's time to market.

27 Claims, 15 Drawing Sheets

1200

REQUIREMENTS TO TEST SYSTEM AND METHOD

CROSS-REFERENCE TO RELATED APPLICATION

This application is a continuation of U.S. Ser. No. 16/420,731, filed May 23, 2019, now U.S. Pat. No. 11,106,569, entitled, "REQUIREMENTS TO TEST SYSTEM AND METHOD" which is incorporated by reference herein in its entirety.

BACKGROUND

Requirements to test (R2T) is a methodology used in computer system validation to ensure a system (e.g., hardware and/or software) operates as intended when utilized in certain industries, such as in healthcare. R2T can be a laborious and error prone manual process by which test scripts are developed to be executed against a given system. Authoring test scripts typically relies on a full understanding of requirements as well as availability and access to the finished product. Execution of developed test scripts is typically a manual process that relies on experienced personnel for an effective execution and production of summary reports. R2T products typically do not combine an automated script generation process with an automated testing process that executes generated test scripts against the client's system.

SUMMARY

An R2T system is implemented that provides an automated system by which a user interface (UI)-test automation script package is generated and the generated scripts therein are executed against software. The R2T system includes various components, including an R2T designer, R2T engine, and an automation platform, each configured to perform one or more unique functions.

A workflow of a client's system (e.g., software) is submitted from a respective client to the R2T system, which may be instantiated on a computing device such as a server that is located remotely from the client. The R2T designer streamlines definitions and documentations with the submitted workflow by creating standardized requirements, such as a process flow, persona definitions, forms, and system behavior. The standardized workflow may be translated into some machine-consumable format, like XML (extensible markup language). Using the translated and machine-consumable business formatted file, the R2T engine utilizes artificial intelligence processing to discover paths for the workflow. The paths are trajectories from a starting point to an end point of the translated workflow. Solution models are applied to the discovered paths to determine how the software will be used, which thereby results in the generation of a series of executable steps. The R2T engine applies validation templates to the executable steps to produce a UI-test automation script package. Each applied validation template is configured to verify and ensure the system satisfies necessary requirements or best practices for Performance Qualification and Operational Qualification such as Task flow, Policy, Team, Security, Audit Trail, 21 CFR Part 11, etc. The generated script package is a collection of test scripts to run against the software associated with the submitted workflow. Each script may test certain validation requirements from the validation templates.

The generated script package is transmitted to an automation platform, which emulates operations performed on the software, such as navigation, data entry, clicks, selections, and the like. The automation platform individually executes the produced script package against the software while simultaneously gathering visual evidence of the actual and expected results to satisfy computer system validation requirements, such as those promulgated by the Food and Drug Administration (FDA). The evidence can include screenshots (e.g., screenshots that visually highlight comparisons between actual and expected results), a video recording of the respective test script's execution against the software, and a traceability matrix that maps requirements to tests, among other evidence.

Deployment of the R2T system expedites the computer system validation process by automating the script generation and script execution processes, which thereby reduces the time to market for client products. The R2T system also increases the quality and accuracy of the validation process by, for example, removing manual operations and human error. The increased accuracy of the validated computer system allows organizations in various industries, such as the life sciences industry, to safely and more confidently embrace the improvements necessary to continuously adapt to ever changing business scenarios and regulations. The automated processes also enable the automatic detection of changes and the respective change's impact on tests.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
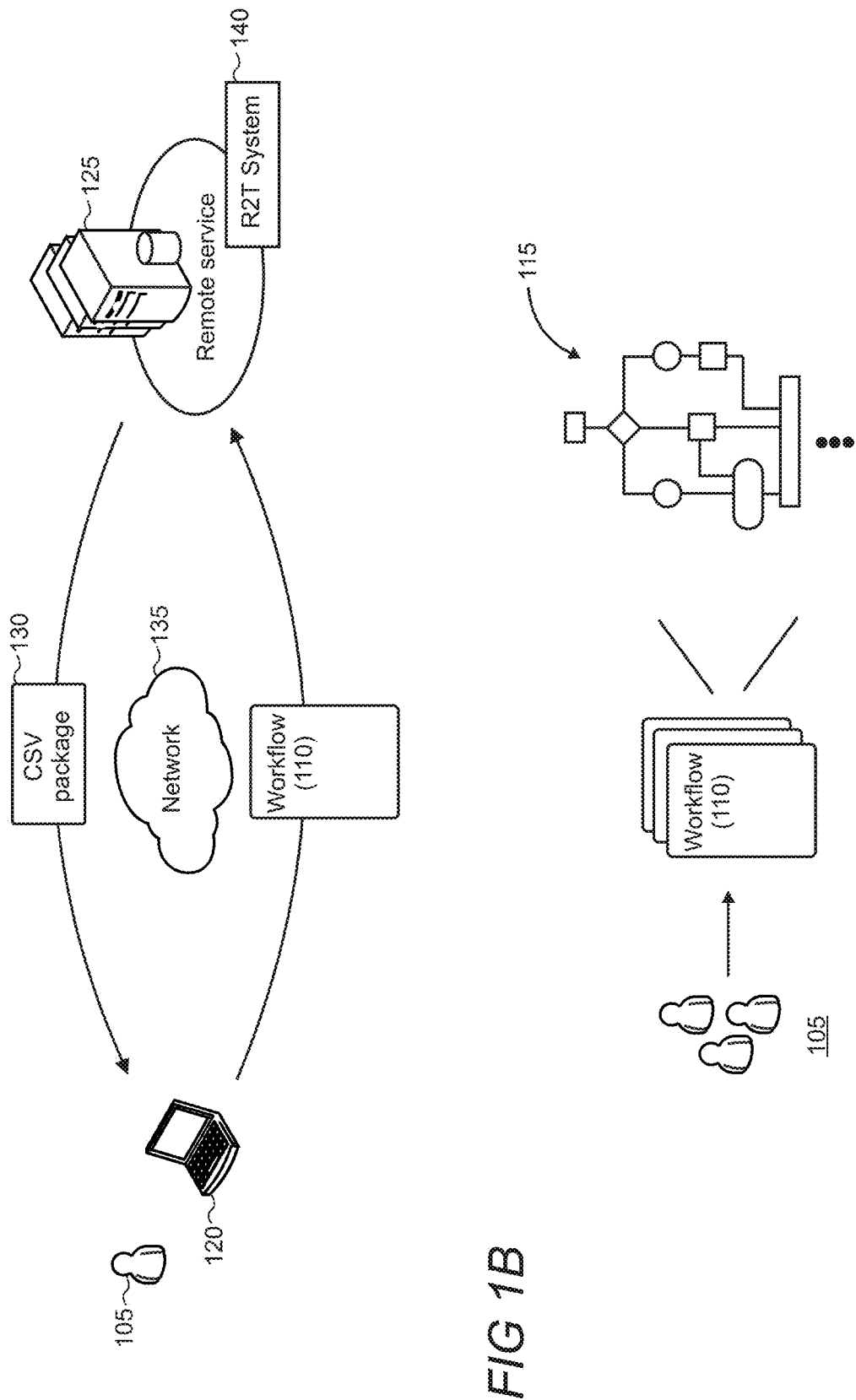
FIG. 1A shows an illustrative environment in which a remote service transmits a computer system validation (CSV) package to a client's computing device responsive to receiving a workflow.
FIG. 1B shows a diagram of an illustrative workflow.

FIG. 1A shows an illustrative environment in which a client's computing device 120 transmits a workflow 110 over a network 135 to a remote service 125 for computer system validation (CSV) of the client's software, when developed. In response to receiving and ingesting the workflow documents from the client user 105, a requirements to test (R2T) system 140 instantiated in the remote service generates and transmits a CSV package 130 to the client. As discussed in greater detail below, the CSV package can include generated test scripts and evidentiary results of the executed test scripts against the software associated with the submitted workflow 110. The network 135 may include any number of networking devices by which data is transmitted and can include, for example, any one or more of a personal area network, local area network, wide area network, the Internet, and the World Wide Web.

FIG. 1B shows an illustrative environment of a visual diagram 115, which may represent the workflow 110 submitted to the remote service 125. The workflow may be a visual representation of processes and tasks for the software and user interface (UI) forms definitions for the workflow's requirements. The workflow may be developed by the one or more people/users 105 within the client's organization to create software that fulfills their demand. The workflow may be different for each client's implementation and desired software, but can include data manipulation and search, conditional scenarios based on the data, and the like.

Workflows can include details of passing documents or data from within a software system. The workflow, or application workflow, can include business logic that prescribes how business objects interact with each other and enforces the routes and the methods by which business objects are accessed and updated. For example, business logic can determine how data is transformed, calculated, processed, etc., and how the data is routed to people or software (i.e., the workflow). The workflow can include business rules which model real-life objects (such as accounts, loans, itineraries, and inventories) into a business policy. Thus, for example, the business logic is directed toward the executed procedures, whereas the business rules are declarative statements or information about the system.

Figure 2:
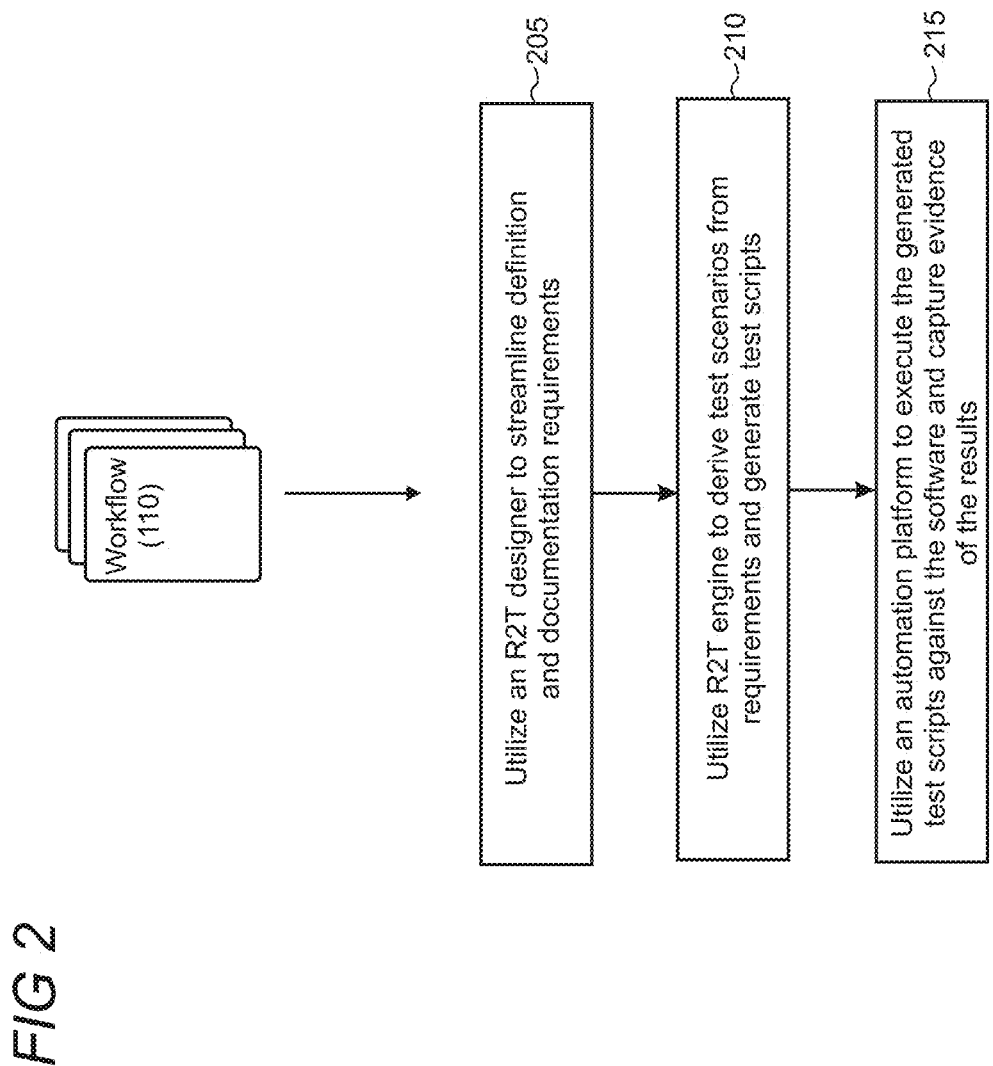
FIG. 2 shows a flowchart of an illustrative process implemented by a requirements to test (R2T) system.

FIG. 2 shows a flowchart of an illustrative process implemented by the R2T system 140 upon receiving the workflow 110. In step 205, the R2T system utilizes an R2T designer to streamline definition and documentation requirements. This step may include standardizing the terms and definitions submitted in the workflow into some machine-consumable format. In step 210, the R2T system utilizes an R2T engine to derive test scenarios and generate test scripts from the machine-consumable workflow. In step 215, the R2T system utilizes an automation platform to execute the generated test scripts against the software and capture evidence of the results.

Figure 3:
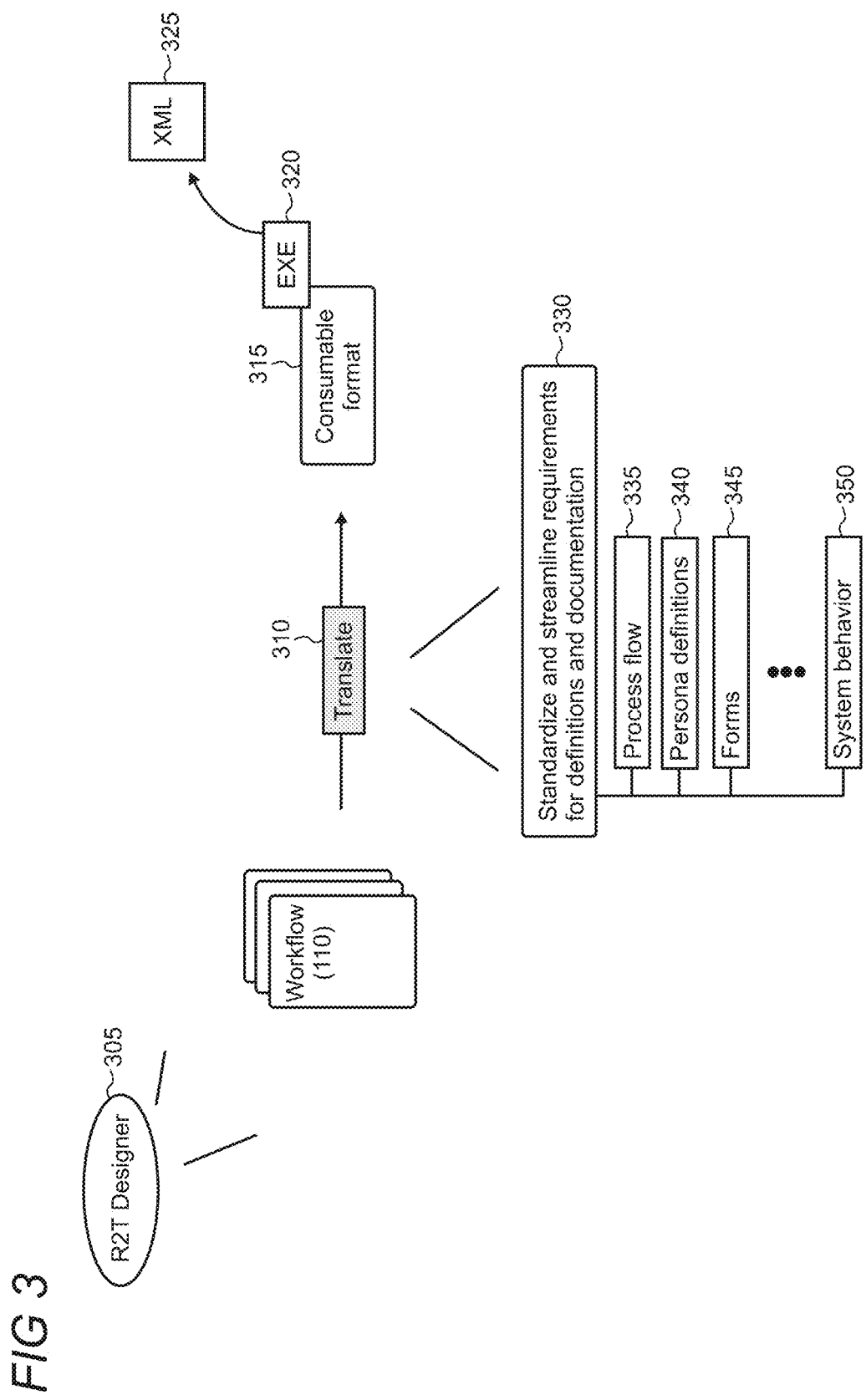
FIG. 3 shows an illustrative diagram in which an R2T designer translates the workflow to machine-consumable format.

FIGS. 3-10 and the accompanying text describe functions and operations performed by the R2T system, including the R2T designer, R2T engine, and R2T automation platform. Turning first to FIG. 3, the R2T designer 305 translates 310 the workflow 110 into a machine-consumable formatted file 315. The machine-consumable file may be in a format that makes the file computer-executable 320, such as in an XML (extensible markup language) format 325 or other format to enable the automated manipulation of the data.

The workflow may be translated to standardize and streamline requirements for definitions and documentation, as representatively shown by numeral 330. The standardization of the workflow can include standardizing the process flow 335, persona definitions 340, forms 345, and system behavior 350. The functions performed in these steps are further shown and described in FIGS. 4-7.

Figure 4:
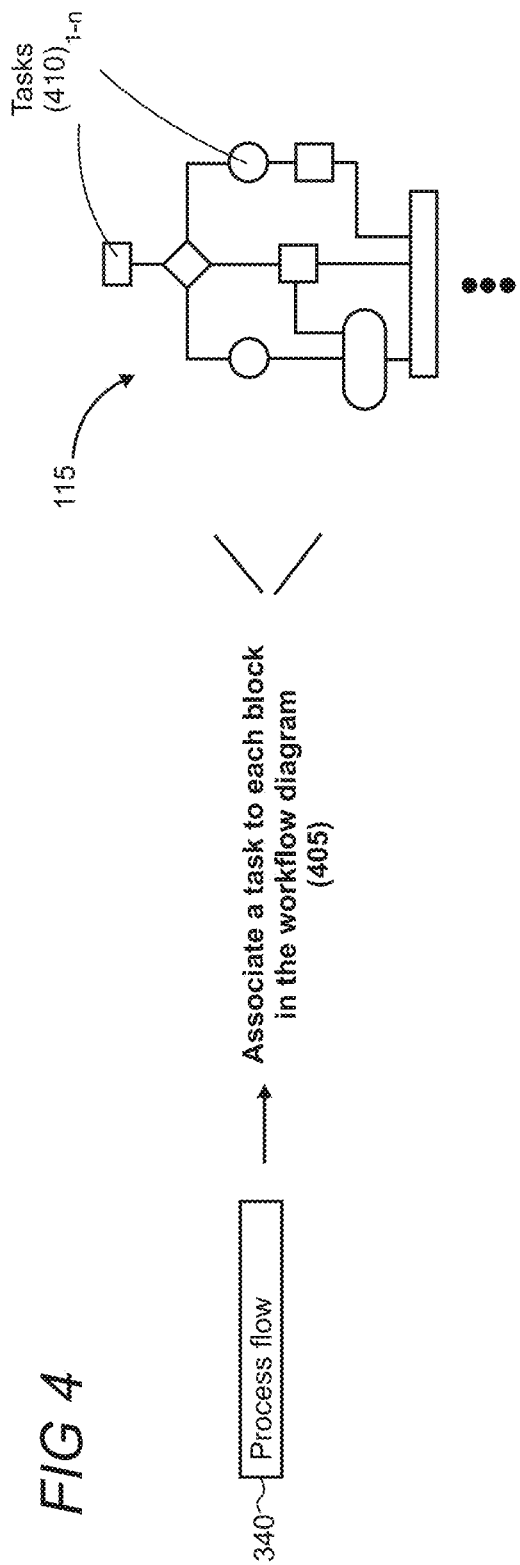
FIG. 4 shows an illustrative diagram in which the R2T designer associates a task to each block in the workflow.

FIG. 4 shows an illustrative diagram in which the R2T designer 305 assigns a task 410 to each block in the workflow diagram 115 for the process flow 340, as representatively shown by numeral 405. Thus, for example, each block in the workflow is associated with a standardized task which the R2T system 140 can subsequently use for automated processing. Tasks can include how the data is manipulated, transmitted, responds to user input on a user interface, etc.

Figure 5:
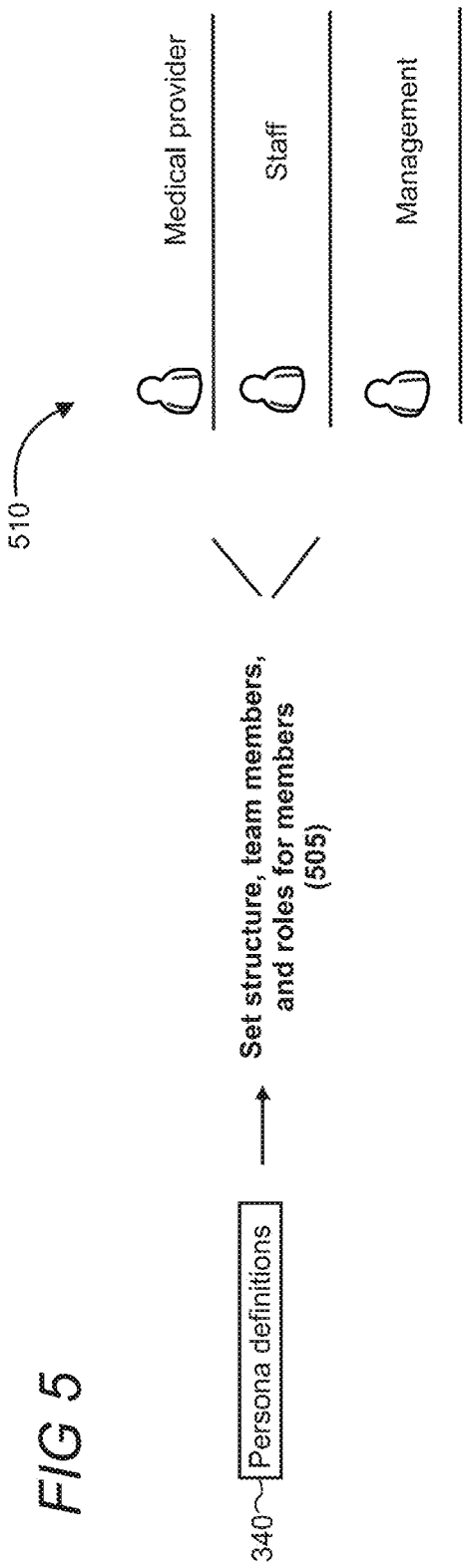
FIG. 5 shows an illustrative diagram in which the R2T designer sets a structure for the workflow.

FIG. 5 shows an illustrative diagram in which the R2T designer 305 sets a structure for the software for the persona definitions 340, as representatively shown by numeral 505. Setting the structure can include setting team members and roles for team members (e.g., security, hierarchical, or group roles). As shown in the table 510, roles for the healthcare industry can include assigning users as medical providers, staff, or management. Roles may likewise be associated with varying levels of access to aspects of the software, such that management may be assigned a higher level of access within the software relative to the staff.

Figure 6:
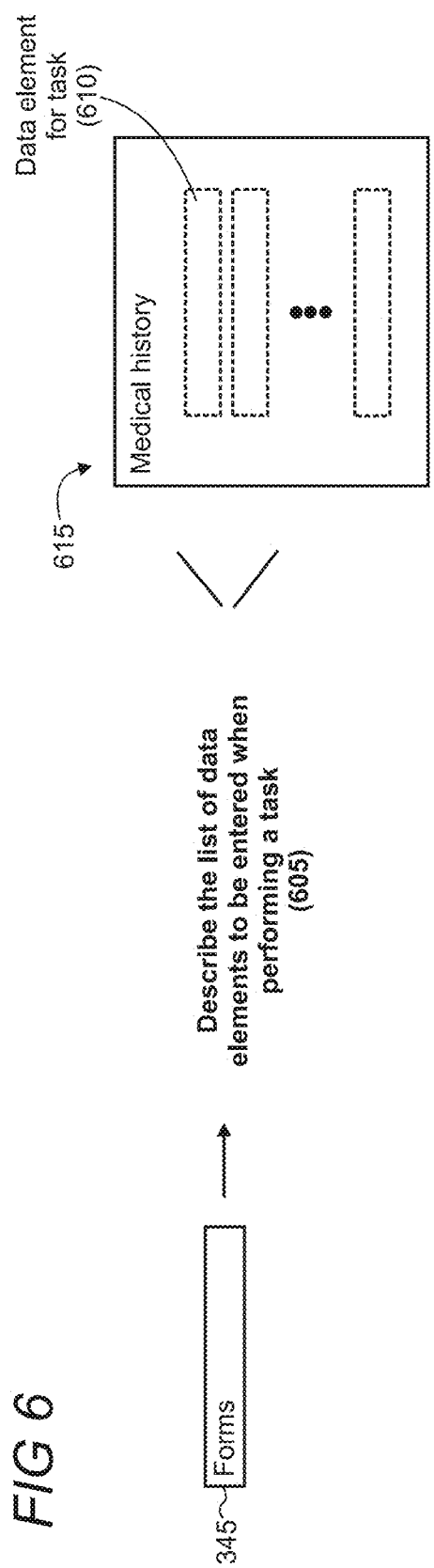
FIG. 6 shows an illustrative diagram in which the R2T designer describes a list of data elements to be entered when performing a task.

FIG. 6 shows an illustrative diagram in which the R2T designer 305 describes a list of data elements to be entered when performing an assigned task, as representatively shown by numeral 605. The exemplary user interface 615, for example, can include various mechanisms by which data elements for a given task 610 can be identified and selected. Multiple data elements can be input for a given assigned task. The data elements may utilize user input, such as text boxes, menu selections, etc., by which the user can input a data element, or can be other processing performed for that task in which a data element is selected. Data elements can, for example, affect conditions in the workflow which determine a trajectory through the executed software.

Figure 7:
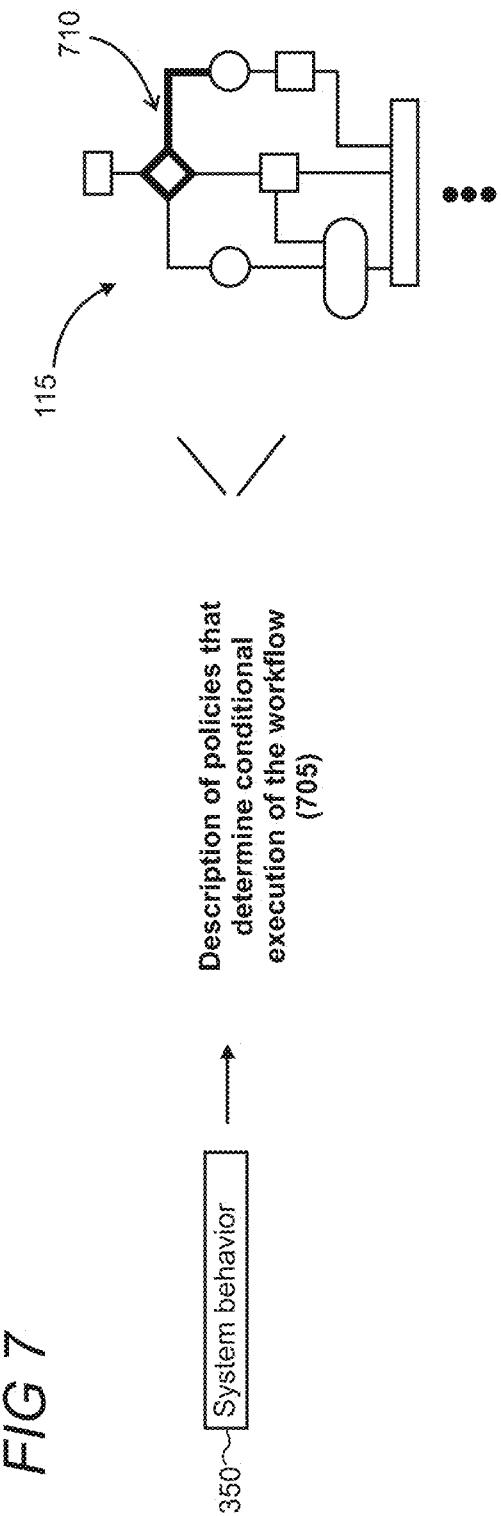
FIG. 7 shows an illustrative diagram in which the R2T designer describes policies for conditional executions within the workflow.

FIG. 7 shows an illustrative diagram in which the R2T designer 305 provides a description of policies that determine conditional execution of the workflow, as representatively shown by numeral 705. For example, at location 710 there may be policy decisions as to how a condition is executed. This condition may determine what path is taken through the software.

Figure 8:
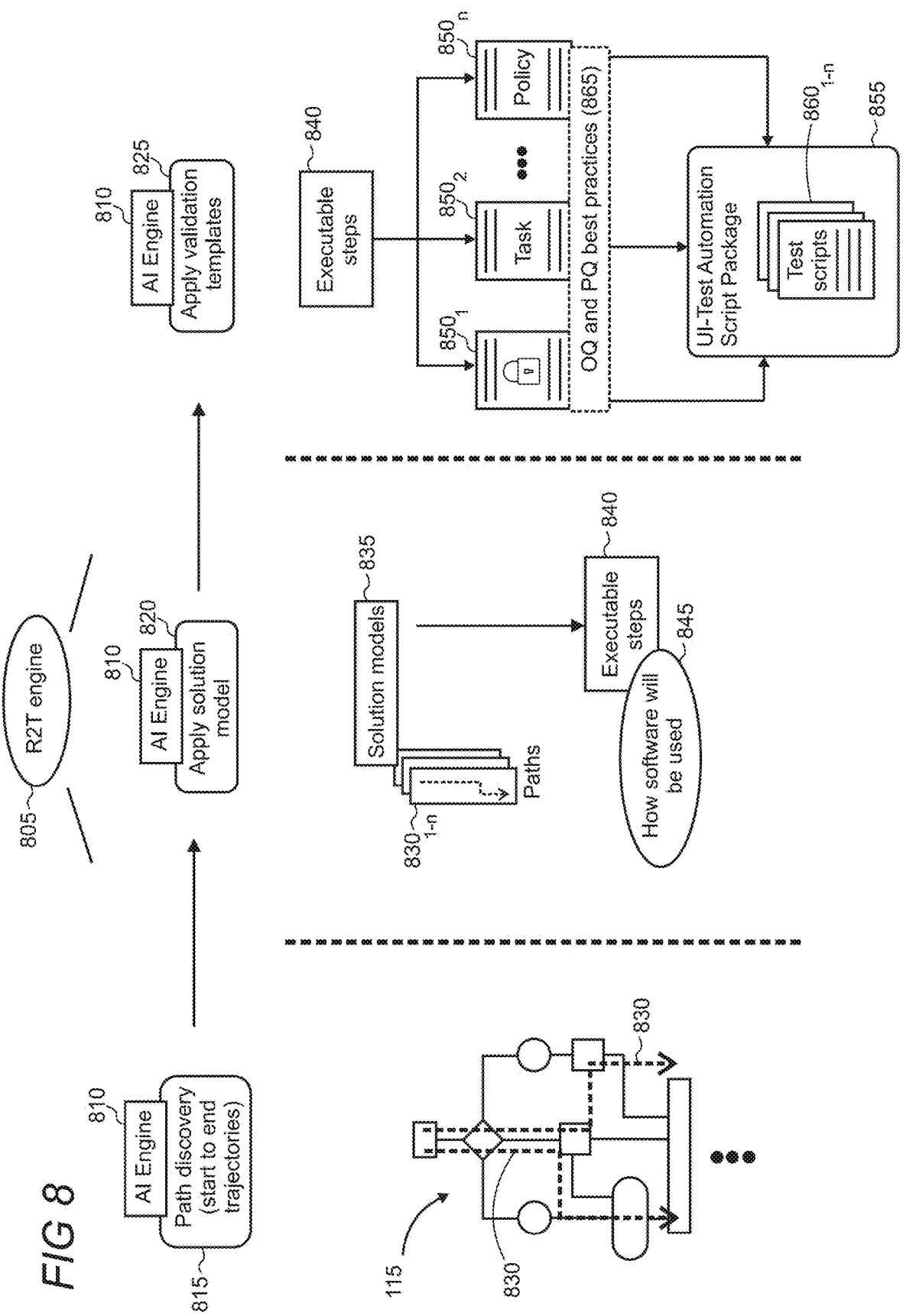
FIG. 8 shows an illustrative environment in which a series of automated artificial intelligence processes are performed by an R2T engine.

FIG. 8 shows an illustrative environment in which the R2T engine 805 uses the translated and machine-consumable formatted file to create a user interface (UI)-test automation script package 855. FIG. 8 depicts three sequential steps which are performed by the R2T engine to create the script package. In step 815, an artificial intelligence (AI) and/or machine learning engine (individually and collectively AI engine 810) is utilized by the R2T engine for path discovery through the translated workflow (i.e., the machine-consumable formatted file). A path may be a trajectory that has a starting and ending point through the workflow. Exemplary paths 830 in the workflow diagram are illustrated in FIG. 8.

In simplified form, a machine learning system includes the steps including raw data ingestion, preparation, model training, and predictions. Raw data may be ingested, such as, in some embodiments, in some tabular format. During preparation, the data may be prepared for use in machine learning training. The data may be randomized to reduce the possibility of an order affecting the machine learning process and separated between a training set for training the model and a testing set for testing the trained model. Other forms of data manipulation may be performed as well, such as normalization, error correction, and the like.

The prepared data may then be used for model training. The model training may be used to incrementally improve the model's ability to make accurate predictions. The model training may use the features contained in the data to form a matrix with weights and biases against the data. Random values within the data may be utilized to attempt prediction of the output based on those values. This process may repeat until a more accurate model is developed which can predict correct outputs. The model may subsequently be evaluated to determine if it meets some accuracy threshold (e.g., 70% or 80% accuracy), and then predictions will be performed. In this step, a question can be posed to the computing device on which the model operates, and the computing device can provide an answer using the developed model.

In step 820, the R2T engine applies a solution model 835 to the discovered paths. The application of the solution models to the paths derives how the software may be used 845 and describes those use cases as a series of executable steps 840. Thus, while numerous paths may have been discovered in step 815, application of the solution models further refines those steps into practical use applications and creates a series of representative executable steps. Utilization of the AI engine 810 may determine the likelihood of how the software will be used responsive to certain tasks within the workflow.

In step 825, the AI engine 810 of the R2T engine 805 applies validation templates to the created executable steps 840. Validation—or test—scripts may be created for the executable steps 840 based on the pre-defined validation templates 850 which are applied to the executable steps. The discovered paths and executable steps provide the R2T engine the framework necessary to apply the validation templates. The AI engine may, for example, create test scripts using the validation templates to ensure that the software does not violate any known requirements, or otherwise satisfies all necessary requirements.

The validation templates may encapsulate synthesized knowledge over computer system validation to produce a final UI-test automation script package comprised of test scripts. For example, illustrative validation templates 850 depicted in FIG. 8 can include a Security Template, Task Template, Policy Template, Team Template, 21 CFR Part 11 Template and other templates depending on the scenario for satisfying Operational Qualification (OQ) and Performance Qualification (PQ) best practices for CSV, as representatively shown by numeral 865. These templates are generically created based on necessary requirements that clients' software should satisfy, such as in accordance with legal requirements and compliance regulations like those promulgated by the FDA.

The pre-defined validation templates are applicable to various software systems for various clients. The validation templates verify and ensure that the software associated with the workflow operates as consistently and reliably as intended to satisfy regulated industries such as the healthcare industry. Once applied, a series of test scripts 860 to be executed against the software are developed in the UI-test automation script package 855. Each script may be tailored to test a specific validation requirement in accordance with a respective validation template.

Figure 9:
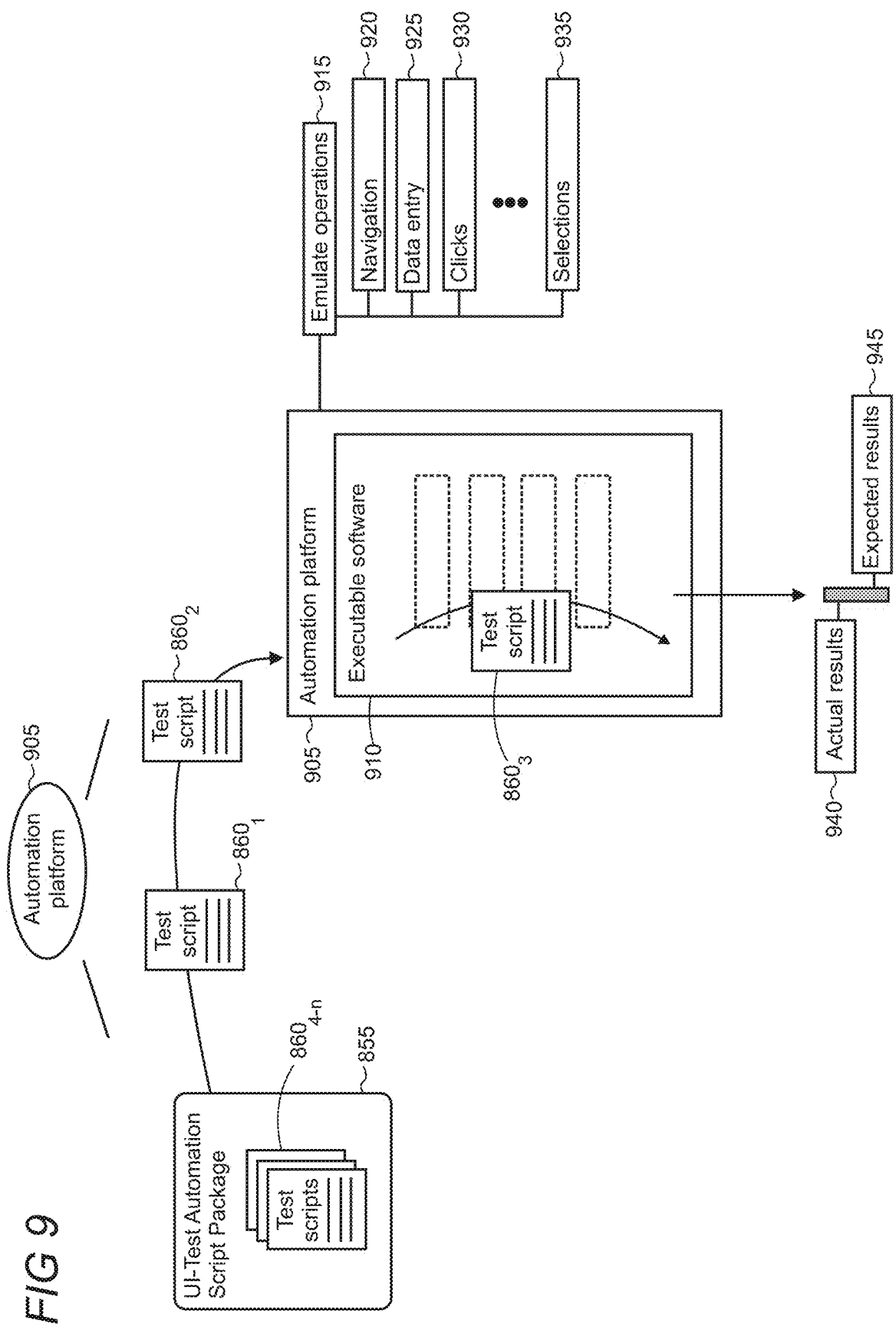
FIG. 9 shows an illustrative diagram in which an automation platform executes generated test scripts software associated with the workflow.

FIG. 9 shows an illustrative environment in which an automation platform 905 executes the generated UI-test automation script package against the executable software 910 associated with the workflow 110 (FIGS. 1-3). The automation platform interoperates with and automatically runs the test scripts through the developed software. The test scripts 860 may be individually executed by the automation platform, which emulates various operations such as those performed by a user, as representatively illustrated by numeral 915. For example, the automation platform emulates navigation 920, data entry 925, clicks 930, and selections 935. The automation platform may emulate these actions for various personas that may operate the software (FIG. 5). Each test script generates actual results 940 which may be compared with expected results 945.

Figure 10:
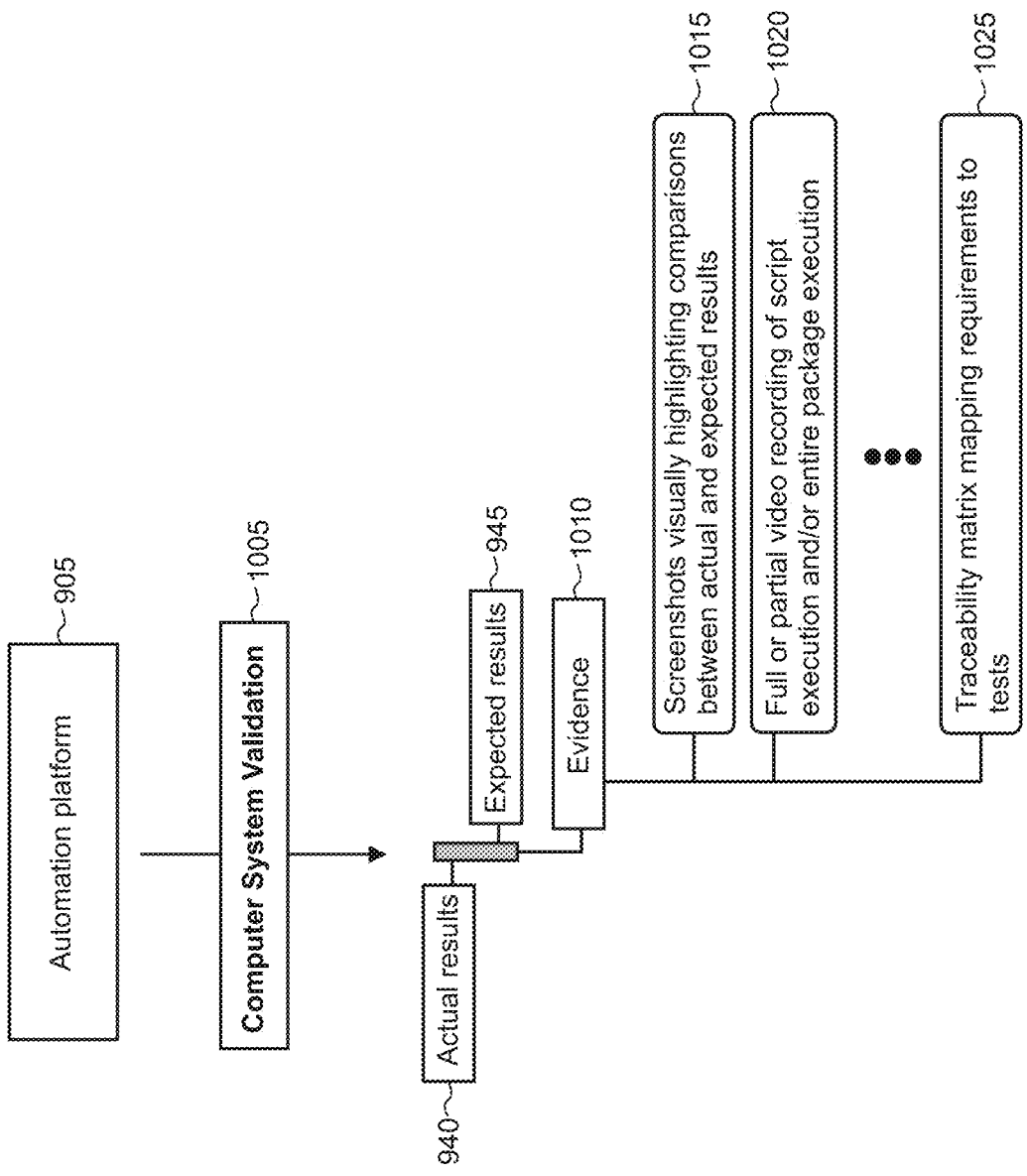
FIG. 10 shows an illustrative diagram in which the automation platform captures evidence of the scripts executed on the software.

FIG. 10 shows a high-level diagram in which the automated platform 905 performs computer system validation 1005 using the UI-test automation script package 855 against the software 910. To satisfy computer system validation requirements for a client's system, evidence 1010 is automatically captured of the actual results and expected results for a given executed test script using, for example, natural language processing (NLP) techniques (e.g., using human language that may be entered into the software). Exemplary captured evidence can include screenshots visually highlighting comparisons between actual and expected results 1015, full or partial video recording of script execution and/or entire package execution 1020, and traceability matrix mapping requirements to tests 1025. The traceability matrix may be utilized to track if the requirements in the various test scripts are satisfied within the software. The requirements proposed by the test scripts are mapped back to the executed steps in the software to be able to identify the evidence and verify that the requirements are met.

Figure 11:
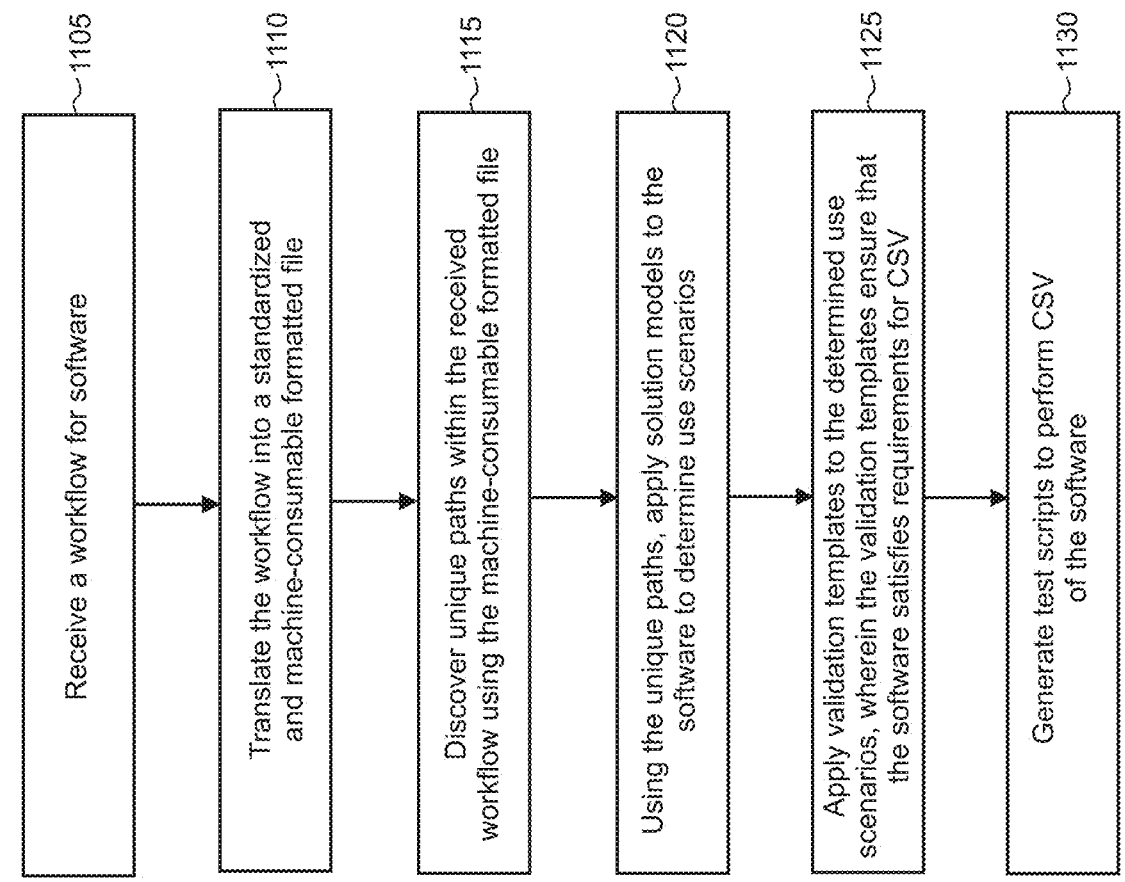
FIGS. 11-13 are flowcharts of illustrative methods performed by one or more computer servers within a datacenter.
Figure 12:
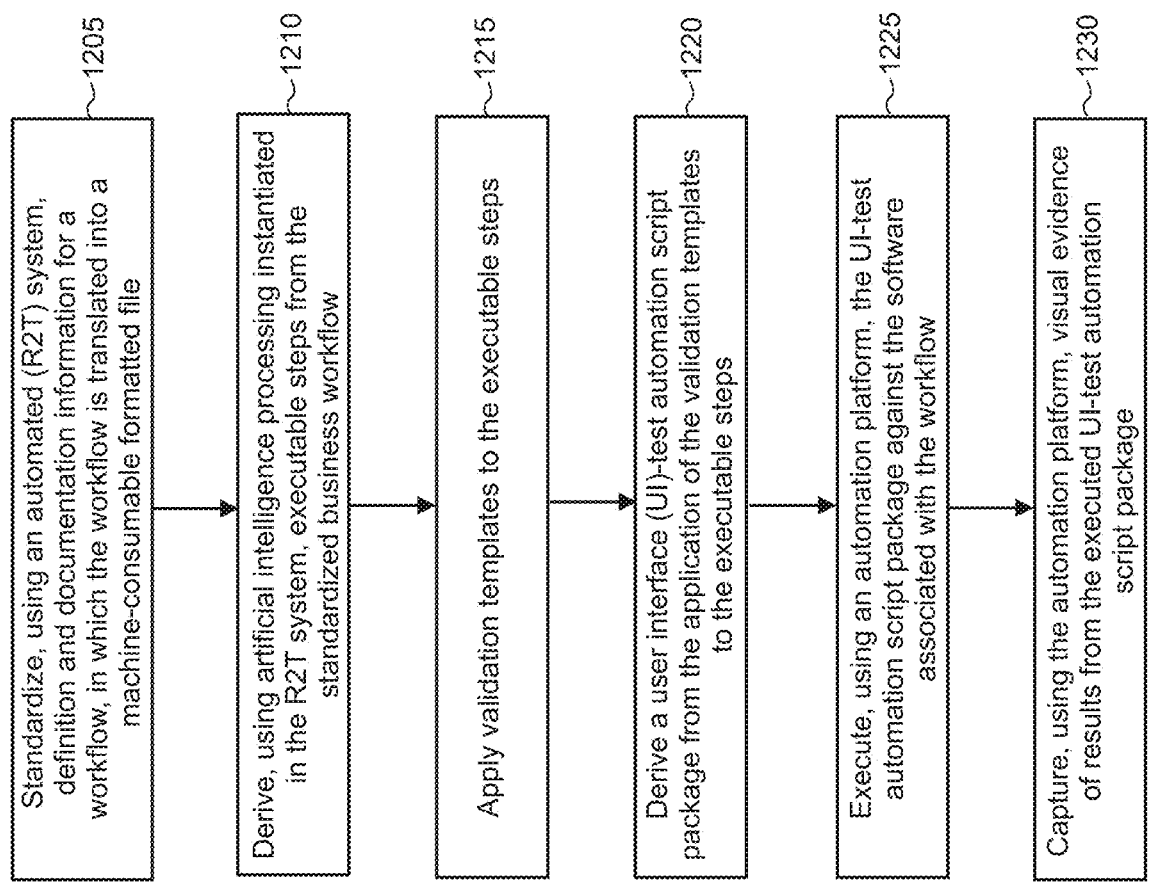
Figure 13:
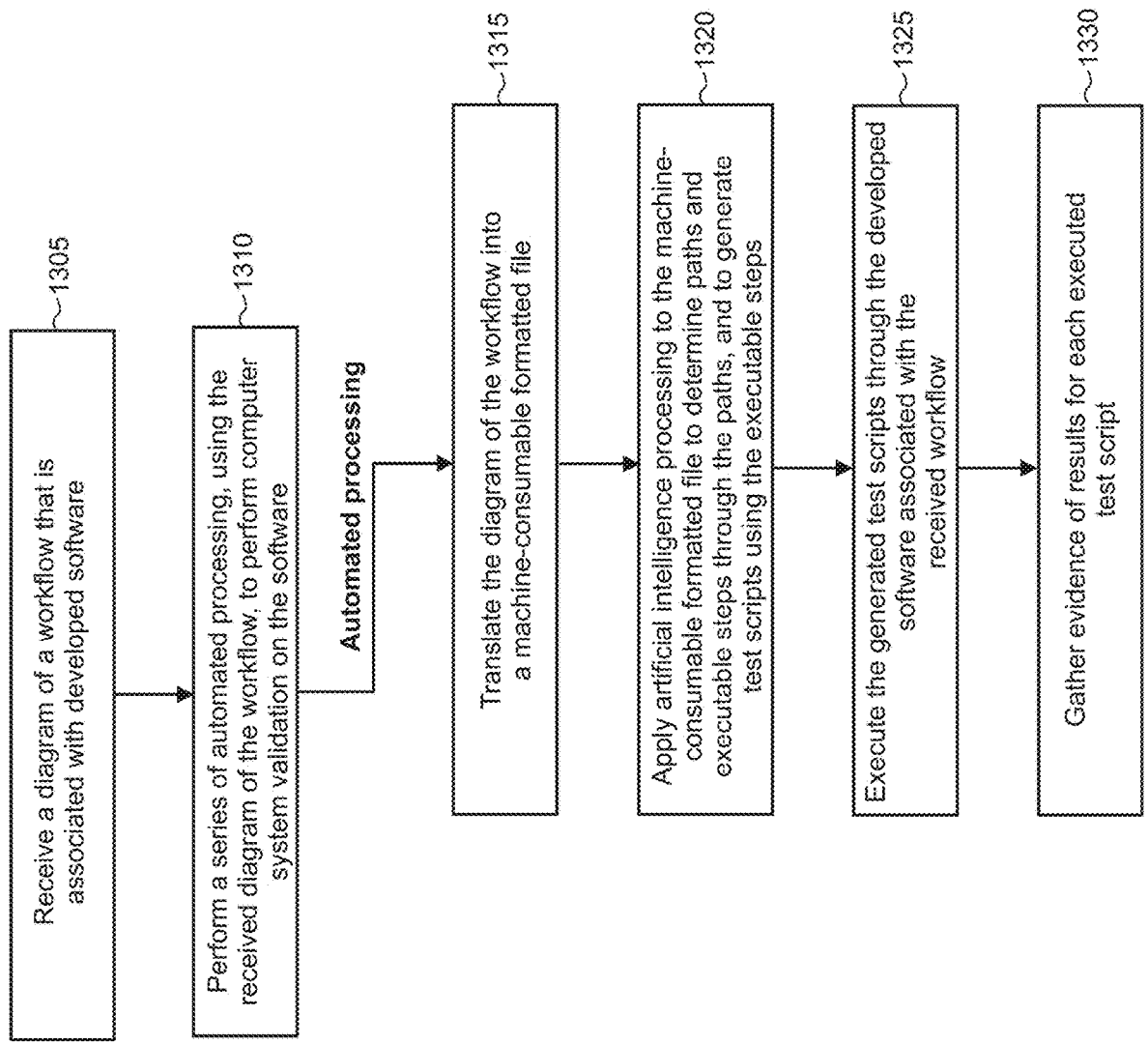

FIGS. 11-13 are flowcharts of illustrative methods 1100, 1200, and 1300, that may be performed using the remote service 125 or other computing device. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1105, in FIG. 11, a computing device receives a workflow for software. In step 1110, the computing device translates the workflow into a standardized and machine-consumable formatted file. In step 1115, the computing device discovers unique paths within the received workflow using the machine-consumable formatted file. In step 1120, the computing device, using the unique paths, applies solution models to the software to determine use scenarios. In step 1125, the computing device applies validation templates to the determined use scenarios. The validation templates ensure that the software satisfies requirements for computer system validation. In step 1130, the computing device generates test scripts to perform computer system validation of the software.

In step 1205, in FIG. 12, a computer server standardizes, using an automated requirements to test (R2T) system, definition and documentation information for a workflow, in which the workflow is translated into a machine-consumable formatted file. In step 1210, the computer server derives, using artificial intelligence processing instantiated in the R2T system, executable steps from the standardized workflow. In step 1215, the computer server applies validation templates to the executable steps. In step 1220, the computer server derives a user interface (UI)-test automation script package from the application of the validation templates to the executable steps. In step 1225, the computer server executes, using an automation platform, the UI-test automation script package against the software associated with the workflow. In step 1230, the computer server captures, using the automation platform, visual evidence of results from the executed UI-test automation script package.

In step 1305, in FIG. 13, a computing device receives a diagram of a workflow that is associated with developed software. In step 1310, the computing device performs a series of automated processing, using the received diagram of the workflow, to perform computer system validation on the software. In step 1315, the computing device translates the diagram of the workflow into a machine-consumable formatted file. In step 1320, the computing device applies artificial intelligence processing to the machine-consumable formatted file to determine paths and executable steps through the paths, and to generate test scripts using the executable steps. In step 1325, the computing device executes the generated test scripts through the developed software associated with the received workflow. In step 1330, the computing device gathers evidence of results for each executed test script.

Figure 14:
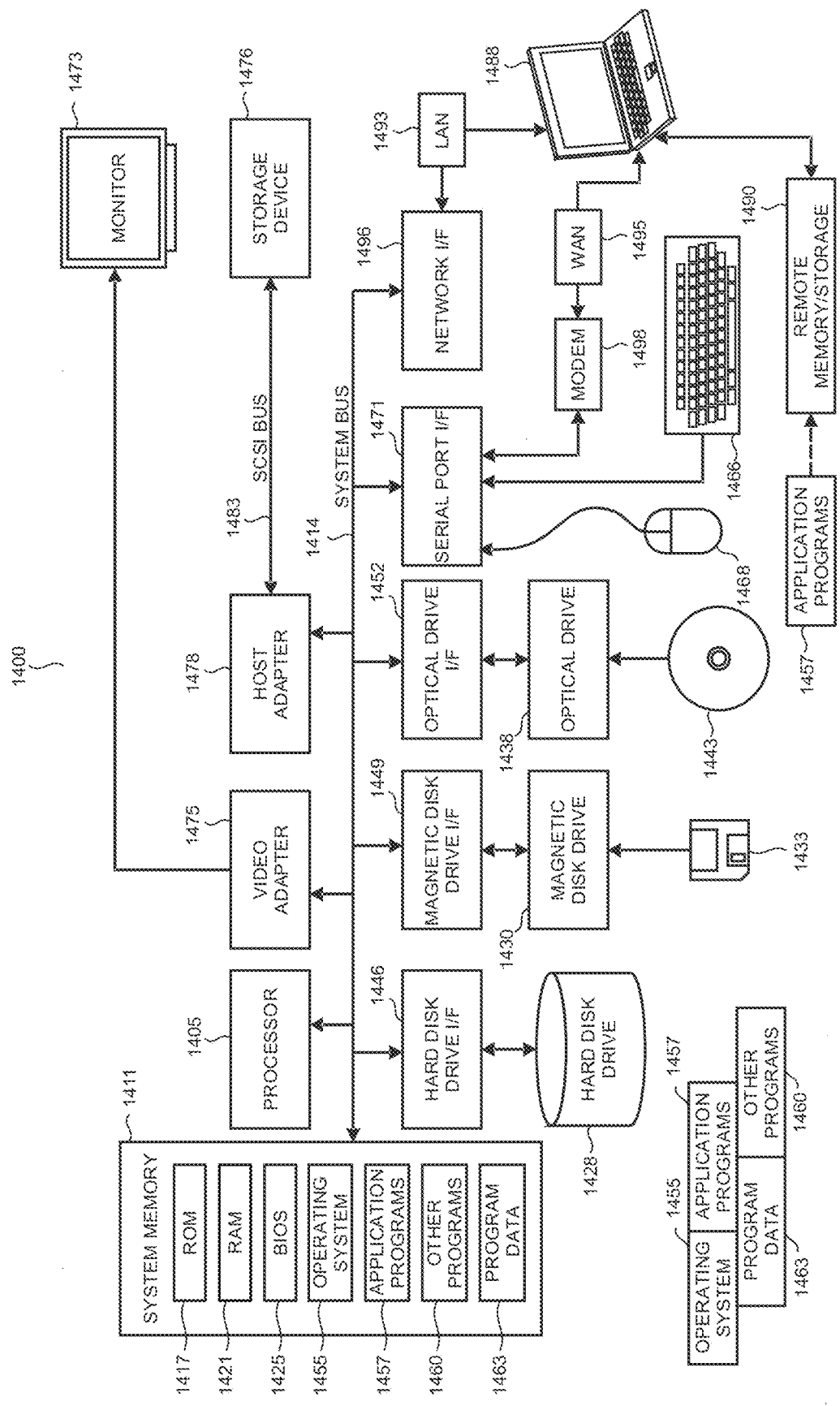
FIG. 14 is a block diagram of an illustrative architecture of a computing system such as a PC (personal computer) or server that may be used at least in part to implement the present requirements to test system.

FIG. 14 is a simplified block diagram of an illustrative architecture of a computer system 1400 such as a PC or server with which the present requirements to test system may be implemented. Computer system 1400 includes a processor 1405, a system memory 1411, and a system bus 1414 that couples various system components including the system memory 1411 to the processor 1405. The system bus 1414 may be any of several types of bus structures including a memory bus or memory controller, a peripheral bus, or a local bus using any of a variety of bus architectures. The system memory 1411 includes read only memory (ROM) 1417 and random-access memory (RAM) 1421. A basic input/output system (BIOS) 1425, containing the basic routines that help to transfer information between elements within the computer system 1400, such as during startup, is stored in ROM 1417. The computer system 1400 may further include a hard disk drive 1428 for reading from and writing to an internally disposed hard disk (not shown), a magnetic disk drive 1430 for reading from or writing to a removable magnetic disk 1433 (e.g., a floppy disk), and an optical disk drive 1438 for reading from or writing to a removable optical disk 1443 such as a CD (compact disc), DVD (digital versatile disc), or other optical media. The hard disk drive 1428, magnetic disk drive 1430, and optical disk drive 1438 are connected to the system bus 1414 by a hard disk drive interface 1446, a magnetic disk drive interface 1449, and an optical drive interface 1452, respectively. The drives and their associated computer-readable storage media provide non-volatile storage of computer-readable instructions, data structures, program modules, and other data for the computer system 1400. Although this illustrative example includes a hard disk, a removable magnetic disk 1433, and a removable optical disk 1443, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present requirements to test system. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 1433, optical disk 1443, ROM 1417, or RAM 1421, including an operating system 1455, one or more application programs 1457, other program modules 1460, and program data 1463. A user may enter commands and information into the computer system 1400 through input devices such as a keyboard 1466 and pointing device 1468 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1405 through a serial port interface 1471 that is coupled to the system bus 1414, but may be connected by other interfaces, such as a parallel port, game port, or universal serial bus (USB). A monitor 1473 or other type of display device is also connected to the system bus 1414 via an interface, such as a video adapter 1475. In addition to the monitor 1473, personal computers typically include other peripheral output devices (not shown), such as speakers and printers. The illustrative example shown in FIG. 14 also includes a host adapter 1478, a Small Computer System Interface (SCSI) bus 1483, and an external storage device 1476 connected to the SCSI bus 1483.

The computer system 1400 is operable in a networked environment using logical connections to one or more remote computers, such as a remote computer 1488. The remote computer 1488 may be selected as another personal computer, a server, a router, a network PC, a peer device, or other common network node, and typically includes many or all of the elements described above relative to the computer system 1400, although only a single representative remote memory/storage device 1490 is shown in FIG. 14. The logical connections depicted in FIG. 14 include a local area network (LAN) 1493 and a wide area network (WAN) 1495. Such networking environments are often deployed, for example, in offices, enterprise-wide computer networks, intranets, and the Internet.

When used in a LAN networking environment, the computer system 1400 is connected to the local area network 1493 through a network interface or adapter 1496. When used in a WAN networking environment, the computer system 1400 typically includes a broadband modem 1498, network gateway, or other means for establishing communications over the wide area network 1495, such as the Internet. The broadband modem 1498, which may be internal or external, is connected to the system bus 1414 via a serial port interface 1471. In a networked environment, program modules related to the computer system 1400, or portions thereof, may be stored in the remote memory storage device 1490. It is noted that the network connections shown in FIG. 14 are illustrative and other means of establishing a communications link between the computers may be used depending on the specific requirements of an application of the present requirements to test system.

Figure 15:
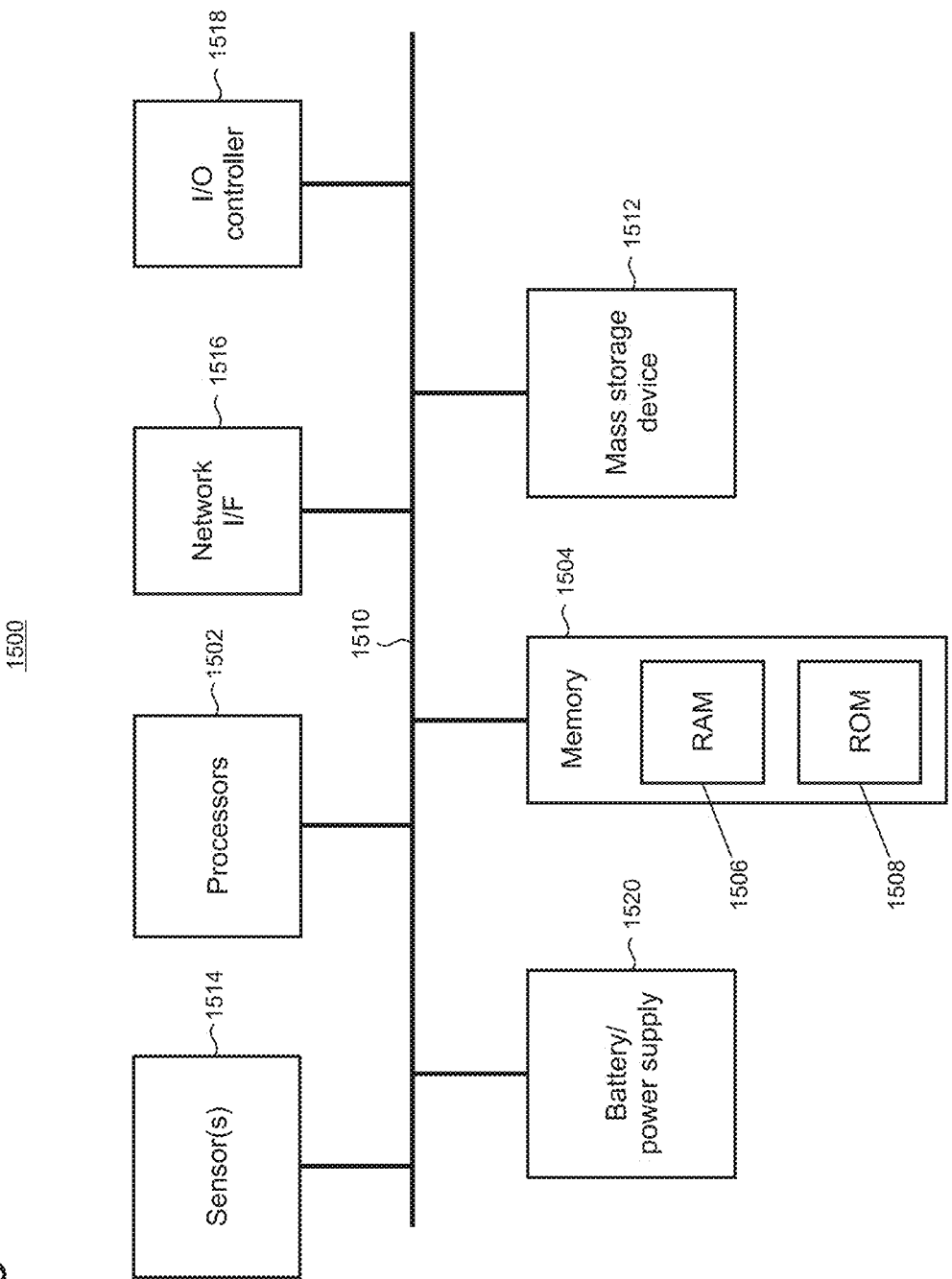
FIG. 15 is a simplified block diagram of an illustrative architecture of a computing device that may be used at least in part to implement the present requirements to test system.

FIG. 15 shows an illustrative architecture 1500 for a client computing device such as a laptop computer or personal computer for the present requirements to test system. The architecture 1500 illustrated in FIG. 15 includes one or more processors 1502 (e.g., central processing unit, dedicated Artificial Intelligence chip, graphics processing unit, etc.), a system memory 1504, including RAM (random access memory) 1506 and ROM (read only memory) 1508, and a system bus 1510 that operatively and functionally couples the components in the architecture 1500. A basic input/output system containing the basic routines that help to transfer information between elements within the architecture 1500, such as during startup, is typically stored in the ROM 1508. The architecture 1500 further includes a mass storage device 1512 for storing software code or other computer-executed code that is utilized to implement applications, the file system, and the operating system. The mass storage device 1512 is connected to the processor 1502 through a mass storage controller (not shown) connected to the bus 1510. The mass storage device 1512 and its associated computer-readable storage media provide non-volatile storage for the architecture 1500. Although the description of computer-readable storage media contained herein refers to a mass storage device, such as a hard disk or CD-ROM drive, it may be appreciated by those skilled in the art that computer-readable storage media can be any available storage media that can be accessed by the architecture 1500.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVD, HD-DVD (High Definition DVD), Blu-ray or other optical storage, magnetic cassette, magnetic tape, magnetic disk storage or other magnetic storage device, or any other medium which can be used to store the desired information and which can be accessed by the architecture 1500.

According to various embodiments, the architecture 1500 may operate in a networked environment using logical connections to remote computers through a network. The architecture 1500 may connect to the network through a network interface unit 1516 connected to the bus 1510. It may be appreciated that the network interface unit 1516 also may be utilized to connect to other types of networks and remote computer systems. The architecture 1500 also may include an input/output controller 1518 for receiving and processing input from a number of other devices, including a keyboard, mouse, touchpad, touchscreen, control devices such as buttons and switches or electronic stylus (not shown in FIG. 15). Similarly, the input/output controller 1518 may provide output to a display screen, user interface, a printer, or other type of output device (also not shown in FIG. 15).

It may be appreciated that the software components described herein may, when loaded into the processor 1502 and executed, transform the processor 1502 and the overall architecture 1500 from a general-purpose computing system into a special-purpose computing system customized to facilitate the functionality presented herein. The processor 1502 may be constructed from any number of transistors or other discrete circuit elements, which may individually or collectively assume any number of states. More specifically, the processor 1502 may operate as a finite-state machine, in response to executable instructions contained within the software modules disclosed herein. These computer-executable instructions may transform the processor 1502 by specifying how the processor 1502 transitions between states, thereby transforming the transistors or other discrete hardware elements constituting the processor 1502.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

The architecture 1500 may further include one or more sensors 1514 or a battery or power supply 1520. The sensors may be coupled to the architecture to pick up data about an environment or a component, including temperature, pressure, etc. Exemplary sensors can include a thermometer, accelerometer, smoke or gas sensor, pressure sensor (barometric or physical), light sensor, ultrasonic sensor, gyroscope, among others. The power supply may be adapted with an AC power cord or a battery, such as a rechargeable battery for portability.

In light of the above, it may be appreciated that many types of physical transformations take place in the architecture 1500 in order to store and execute the software components presented herein. It also may be appreciated that the architecture 1500 may include other types of computing devices, including wearable devices, handheld computers, embedded computer systems, smartphones, PDAs, and other types of computing devices known to those skilled in the art. It is also contemplated that the architecture 1500 may not include all of the components shown in FIG. 15, may include other components that are not explicitly shown in FIG. 15, or may utilize an architecture completely different from that shown in FIG. 15.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer readable medium comprising instructions to cause a processor to:
   translate a workflow related to a computer program into a machine-executable formatted file, wherein the workflow includes process flow, definitions, forms, and/or behavior;
   identify unique paths that include different trajectories between a beginning point and an ending point within the translated workflow;
   apply a solution model to the identified unique paths to determine use scenarios based on how the computer program is used with respect to the identified unique paths;
   generate computer-readable scripts to emulate user interactions with the computer program in accordance with the identified unique paths, including to emulate navigation, to emulate data entry, to emulate pointer operations, and to emulate selection operations; and
   record information generated by the computer program when the computer program and the scripts are executed.

2. The non-transitory computer readable medium of claim 1, wherein the recorded information comprises data representing visual outputs of the computer program.

3. The non-transitory computer readable medium of claim 1, further comprising instructions to cause the processor to:
   generate test scripts to validate features of the computer program;
   combine the test scripts with the scripts; and
   record information generated by the computer program when the computer program and the combined scripts and test scripts are executed.

4. The non-transitory computer readable medium of claim 3, further comprising instructions to cause the processor to:
   generate the test scripts based on pre-defined validation templates that include a security validation template, a task validation template, a policy validation template, and/or a team validation template.

5. The non-transitory computer readable medium of claim 1, further comprising instructions to cause the processor to:
   generate the scripts based on the use scenarios.

6. The non-transitory computer readable medium of claim 1, further comprising instructions to cause the processor to:
   determine a likelihood of how the computer program will be used responsive to tasks of the workflow.

7. The non-transitory computer readable medium of claim 1, further comprising instructions to cause the processor to:
   translate the workflow into a standardized machine-executable format.

8. The non-transitory computer readable medium of claim 1, further comprising instructions to cause the processor to:
   evaluate the translated workflow to identify multiple unique paths between the beginning point and the ending point within the translated workflow.

9. The non-transitory computer readable medium of claim 1, wherein artificial intelligence is used to:
   identify the paths;
   generate the computer-readable scripts;
   determine a likelihood of how the computer program will be used responsive to tasks of the workflow;
   apply a solution model to the identified paths to determine use scenarios based on how the computer program is used with respect to the identified paths; and/or
   create test scripts using validation templates to ensure that the computer program does not violate a requirement.

10. An apparatus, comprising a processor and memory configured to:
    translate a workflow related to a computer program into a machine-executable formatted file, wherein the workflow includes process flow, definitions, forms, and/or behavior;
    identify unique paths that include different trajectories between a beginning point and an ending point within the translated workflow;
    apply a solution model to the identified unique paths to determine use scenarios based on how the computer program is used with respect to the identified unique paths;
    generate computer-readable scripts to emulate user interactions with the computer program in accordance with the identified unique paths, including to emulate navigation, to emulate data entry, to emulate pointer operations, and to emulate selection operations; and
    record information generated by the computer program when the computer program and the scripts are executed.

11. The apparatus of claim 10, wherein the recorded information comprises data representing visual outputs of the computer program.

12. The apparatus of claim 10, wherein the processor and memory are further configured to:
    generate test scripts to validate features of the computer program;
    combine the test scripts with the scripts; and
    record information generated by the computer program when the computer program and the combined scripts and test scripts are executed.

13. The apparatus of claim 12, wherein the processor and memory are further configured to:
    generate the test scripts based on pre-defined validation templates that include a security validation template, a task validation template, a policy validation template, and/or a team validation template.

14. The apparatus of claim 10, wherein the processor and memory are further configured to:
    generate the scripts based on the use scenarios.

15. The apparatus of claim 10, wherein the processor and memory are further configured to:
    determine a likelihood of how the computer program will be used responsive to tasks of the workflow.

16. The apparatus of claim 10, wherein the processor and memory are further configured to:
    translate the workflow into a standardized machine-executable format.

17. The apparatus of claim 10, wherein the processor and memory are further configured to:

evaluate the translated workflow to identify multiple unique paths between the beginning point and the ending point within the translated workflow.

18. The apparatus of claim 10, wherein artificial intelligence is used to:
identify the paths;
generate the computer-readable scripts;
determine a likelihood of how the computer program will be used responsive to tasks of the workflow;
apply a solution model to the identified paths to determine use scenarios based on how the computer program is used with respect to the identified paths;
and/or create test scripts using validation templates to ensure that the computer program does not violate a requirement.

19. A machine-implemented method, comprising:
translating a workflow related to a computer program into a machine-readable machine-executable formatted file, wherein the workflow includes process flow, definitions, forms, and/or behavior;
identifying unique paths that include different trajectories between a beginning point and an ending point within the translated workflow;
applying a solution model to the identified unique paths to determine use scenarios based on how the computer program is used with respect to the identified unique paths;
generating computer-readable scripts to emulate user interactions with the computer program in accordance with the identified unique paths, including to emulate navigation, to emulate data entry, to emulate pointer operations, and to emulate selection operations; and
recording information generated by the computer program when the computer program and the scripts are executed.

20. The machine-implemented method of claim 19, wherein the recorded information comprises data representing visual outputs of the computer program.

21. The machine-implemented method of claim 19, wherein:
the generating comprises generating test scripts to validate features of the computer program and combining the test scripts with the scripts; and
the recording comprises recording information generated by the computer program when the computer program and the combined scripts and test scripts are executed.

22. The machine-implemented method of claim 21, wherein the generating further comprises:
generating the test scripts based on pre-defined validation templates that include a security validation template, a task validation template, a policy validation template, and/or a team validation template.

23. The machine-implemented method of claim 19, wherein the generating comprises:
generating the scripts based on the use scenarios.

24. The machine-implemented method of claim 19, wherein the generating comprises:
determining a likelihood of how the computer program will be used responsive to tasks of the workflow.

25. The machine-implemented method of claim 19, wherein the translating comprises:
translating the workflow into a standardized machine-executable format.

26. The machine-implemented method of claim 19, wherein the identifying comprises:
evaluating the translated workflow to identify multiple unique paths between the beginning point and the ending point within the translated workflow.

27. The machine-implemented method of claim 19, wherein artificial intelligence is used to:
identify the paths;
generate the computer-readable scripts;
determine a likelihood of how the computer program will be used responsive to tasks of the workflow;
apply a solution model to the identified paths to determine use scenarios based on how the computer program is used with respect to the identified paths; and/or
create test scripts using validation templates to ensure that the computer program does not violate a requirement.

* * * * *